United States Patent Office 3,305,521
Patented Feb. 21, 1967

3,305,521
ORGANO - OXYTHIOCARBONYL AROMATIC DISULFIDE STABILIZERS FOR SYNTHETIC RUBBER
Keith Reeve Taylor, Gerrards Cross, England, and Joseph Patrick Brown, Geufron, Llangollen, Wales, assignors to Monsanto Chemicals Limited, London, England, a British company
No Drawing. Filed July 22, 1963, Ser. No. 296,460
Claims priority, application Great Britain, July 26, 1962, 28,691/62
8 Claims. (Cl. 260—45.9)

This invention relates to stabilized synthetic rubbers, and to a new process for the production of certain chemical compounds that are useful as stabilizers for synthetic rubbers.

Most unvulcanized synthetic rubbers undergo deterioration on storage unless a protective agent or stabilizer is added, and in many instances the deterioration is characterized by the formation of gel—that is regions in a rubber that have become hard and where rubbery properties have been lost. Gel formation can sometimes be observed as the hardening and cracking of the surface of a rubber.

Certain chemical compounds have now been found to be very effective in retarding the deterioration of unvulcanized synthetic rubbers.

The invention comprises a synthetic rubber containing as a stabilizer an organo-oxythiocarbonyl aromatic disulfide. A typical stabilizer is for instance ethoxythiocarbonyl phenyl disulfide.

The invention also includes a process for the production of an organo-oxythiocarbonyl aromatic disulfide, in which a xanthate is reacted with an aromatic sulphenyl halide.

In general the stabilizer is a compound having the formula:

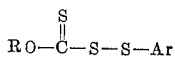

where R is an organic group and Ar is an aromatic group.

Synthetic rubbers that can be stabilized are usually those containing ethylenic unsaturation, for example those derived from a diene.

In the stabilizers the organo group is preferably aliphatic, for example an alkyl group, such as a methyl, ethyl, n-butyl or tert.-butyl group; a cycloalkyl group such as a cyclohexyl group; or one of these groups having an aromatic substituent for instance an aralkyl group such as a benzyl group or an aryloxyalkyl group such as a phenoxyethyl group The aromatic group of the organo-oxythiocarbonyl aromatic disulfide that is linked through the disulfide system to the organo-oxythiocarbonyl group is usually one having a carbocyclic nucleus for instance an aryl group such as a phenyl, tolyl, naphthyl or biphenylyl group, or one of these groups having a substituent. A substituent can be for example a halogen atom, such as chlorine or bromine; a hydroxy group; an alkoxy group, such as a methoxy or ethoxy group; a nitro group; or an amino group.

The preferred organo-oxythiocarbonyl aromatic disulfides are generally those having the formula above in which R is a lower alkyl group such as for instance a methyl, ethyl or butyl group and Ar is a phenyl or substituted phenyl group. Compounds in which Ar is a nitrophenyl group or a nitrophenyl group having a further substituent, for instance a nitrotolyl or chloronitrophenyl group, are particularly effective as synthetic rubber stabilizers.

Specific examples of organo-oxythiocarbonyl aryl disulfides of the invention are methoxythiocarbonyl phenyl disulfide,
ethoxythiocarbonyl phenyl disulfide,
ethoxythiocarbonyl 2-nitrophenyl disulfide,
ethoxythiocarbonyl 2,4-dinitrophenyl disulfide,
ethoxythiocarbonyl 4-methyl-2-nitrophenyl disulfide,
ethoxythiocarbonyl naphthyl disulfide,
isopropoxythiocarbonyl 4-nitrophenyl disulfide,
n-butoxythiocarbonyl phenyl disulfide,
n-butoxythiocarbonyl 2-nitrophenyl disulfide,
benzyloxythiocarbonyl 2-nitrophenyl disulfide,
cyclohexyloxythiocarbonyl 2-nitrophenyl disulfide,
ethoxythiocarbonyl 4-chlorophenyl disulfide,
n-propoxythiocarbonyl 2-aminophenyl disulfide,
amyloxythiocarbonyl 2-nitrophenyl disulfide,
hexyloxyethiocarbonyl 2-nitrophenyl disulfide and
octyloxythiocarbonyl 2-nitrophenyl disulfide.

In the process of the invention, in which a xanthate is reacted with an aromatic sulphenyl halide, the xanthate is usually a xanthate salt. Salts that can be used include for example metal salts and salts with nitrogeneous bases. Water-soluble salts are often particularly suitable; these generally include the alkali metal salts, such as the sodium and potassium salts, the ammonium salts, and salts with amines, for example diethylamine.

In the production of an organo-oxythiocarbonyl aromatic disulfide of the formula given above, the xanthate is usually a compound having the formula:

where R is the same as the organo group in the product and M represents an appropriate cation.

The aromatic sulphenyl halide that is employed in the process is such as to provide the aromatic group in the product that is linked through the disulfide system to the organo-oxythiocarbonyl group. It is usually an aromatic sulphenyl chloride or bromide.

The process is normally carried out by mixing appropriate quantities (generally equimolar or approximately equimolar quantities) of the reactants in the presence of a diluent. In most instances the temperature of reaction need not exceed about 50° C., and operation within the range of 0° to 30° C., for example at about 20° C., is normally satisfactory.

In a preferred method, an aqueous solution of the xanthate is shaken with a solution of the aromatic sulphenyl halide in a water-immiscible organic solvent, for example ether, petroleum ether or carbon tetrachloride, and the product is isolated from the organic solvent.

Synthetic rubbers that can be stabilized by the organo-oxythiocarbonyl aromatic disulfides deteriorate by absorption of oxygen from the air. Such rubbers include polymers of 1,3-butadienes, for instance 1,3-butadiene itself or of isoprene. Examples of homopolymers are cis-polybutadiene and cis-polyisoprene. Also included are copolymers of 1,3-butadienes with other monomers such as for instance styrene, acrylonitrile, isobutylene or methyl methacrylate, and polyolefin rubbers, for instance ethylene-propylene copolymers. The compounds are particularly effective stabilizers for styrene-butadiene rubbers.

The amount of the stabilizer used in the rubber can vary between wide limits, but in general it has been found preferable to use from 0.2 to 3 parts by weight and particularly from 0.5 to 2 parts by weight, per hundred parts by weight of rubber. Amounts somewhat outside these limits can sometimes be employed, for instance from 0.1 to 5 parts of the stabilizer per hundred parts of rubber. Very satisfactory results have been obtained using about 1 part by weight per hundred parts by weight of rubber.

The organo-oxythiocarbonyl aromatic disulfide can be incorporated into the rubber by milling; or where the rubber is produced by an emulsion polymerisation process for example, the stabilizer (generally for this purpose formulated as an emulsion) can be added to the latex before coagulation; or where the rubber is produced by polymerising the appropriate monomer or monomers in solution, this solution can be treated with a solution of the stabilizer in a suitable solvent before the solid rubber is isolated. The stabilizers do not discolor the rubber.

A synthetic rubber containing an organo-oxythiocarbonyl aromatic disulfide as stabilizer can if desired be vulcanized by a conventional process appropriate to the particular synthetic rubber concerned.

The invention is illustrated by the following examples.

*Example 1*

This example describes the preparation of the compound ethoxythiocarbonyl 2-nitrophenyl disulfide.

A solution of 5.7 grams of 2-nitrobenzenesulphenyl chloride in 60 cc. of ether was shaken at room temperature with a solution of 6 grams of potassium ethyl xanthate in 15 cc. of water for 15 minutes. The ether layer was then separated and dried. On evaporation of the solvent, 8 grams of a crystalline residue was obtained. This was washed with a small volume of ether and then recrystallized from petroleum ether to give ethoxythiocarbonyl 2-nitrophenyl disulfide as pale yellow needles having a melting point of 62°–63° C. Found: C, 40.1; H, 3.4; N, 5.1; S, 34.8. $C_9H_9NO_3S_3$ requires: C, 39.3; H, 3.3; N, 5.1; S, 34.9%.

*Example 2*

This example illustrates the use of ethoxythiocarbonyl 2-nitrophenyl disulfide as a stabilizer for a styrene-butadiene rubber.

The effectiveness of the stabilizer was assessed by recording the time taken for the entire surface of a sample of rubber containing the stabilizer to harden and crack, in comparison with a similar sample of rubber containing no stabilizer.

0.1 gram of ethoxythiocarbonyl 2-nitrophenyl disulfide was milled at room temperature into 10 grams of a styrene-butadiene rubber containing no other additive. When mixing was complete, the rubber was pressed out to a sheet having a thickness of 5 thousandths of an inch and was provided on one side with a backing of aluminum foil. Strips were cut from the laminate thus obtained and placed in an air oven at 100° C. Similar control strips were prepared from a further quantity of the styrene-butadiene rubber to which no stabilizer was added.

Strips were removed from the oven at intervals and the extent of degradation of the rubber was assessed by visual examination of the exposed surfaces.

Hardening of the entire surface of the control samples occurred within four hours, whereas the same stage was not reached with the samples containing ethoxythiocarbonyl 2-nitrophenyl disulfide until after 25 hours, thus showing the effectiveness of ethoxythiocarbonyl 2-nitrophenyl disulfide as a stabilizer.

*Example 3*

This example describes the preparation of the compound ethoxythiocarbonyl phenyl disulfide.

To a solution of 29 grams of benzenesulphenyl chloride in 300 cc. of anhydrous ether was added dropwise over a period of 15 minutes a solution of 40 grams of potassium ethyl xanthate in 100 cc. of water. Cooling was required to maintain the temperature at 23°–31° C. during the addition. Stirring was continued for 15 minutes. The ether layer was then separated, dried over sodium sulfate and filtered through clay. The ether was evaporated in vacuo at room temperature and finally at room temperature at 1–2 mm. overnight. 29 grams of a golden oil were obtained.

*Example 4*

This example illustrates the use of ethoxythiocarbonyl phenyl disulfide as a stabilizer for a styrene-butadiene rubber.

The effectiveness of the stabilizer was assessed by recording the viscosity change of a sample of rubber containing the stabilizer in comparison with a similar sample of rubber containing no stabilizer.

Approximately 1450 ml. of styrene-butadiene copolymer rubber latex (SB–R 1500 latex containing 23.5% bound styrene, no stabilizer, 22.5% total solids) were coagulated by adding 600 ml. of 10% sodium chloride solution followed by 1500 ml. of isopropanol and the coagulum washed and dried. Ethoxythiocarbonyl phenyl disulfide was milled at 50° C. into 200 gram portions of the styrene-butadiene rubber coagulum thus prepared. One portion contained 0.6 part and another portion contained 1.2 parts by weight of stabilizer per 100 parts by weight of rubber. The rubber was sheeted out at a mill setting of .008 inch and sheets cut 7 x 7 inch for aging in air oven at 100° C. The rubber sheets were placed on Teflon sheets which were in turn placed on supporting screens about midway from the bottom in 8 x 8 x 2 inch aluminum pans. The pans were covered with glass plates and placed in an air oven for 24 and 48 hours. Similar strips were prepared from a further quantity of the styrene-butadiene rubber coagulum to which no stabilizer was added.

Sheets were removed from the oven at intervals and the extent of degradation was assessed by measuring viscosity by means of a Mooney plastometer.

Hardening of the control samples to such extent that the Mooney viscosity was approximately twice that it was before aging occurred within 48 hours whereas the samples containing ethoxythiocarbonyl phenyl disulfide remained soft and pliable.

It is intended to cover all changes and modifications of the examples of the invention herein chosen for purposes of disclosure which do not constitute departure from the spirit and scope of the invention.

What is claimed is:

1. A synthetic rubber which deteriorates by absorption of oxygen from the air selected from the group consisting of homopolymers of butadiene-1,3, homopolymers of isoprene, copolymers of butadiene-1,3 with styrene, acrylonitrile, isobutylene, or methyl methacrylate, and copolymers of ethylene and propylene containing a stabilizing amount of an organo-oxythiocarbonyl aryl disulfide where organo designates a radical selected from the group consisting of alkyl, cycloalkyl, aralkyl, aryloxyalkyl, and aryl.

2. A styrene-butadiene synthetic rubber containing a stabilizing amount of an organo-oxythiocarbonyl aryl disulfide where organo designates a radical selected from the group consisting of alkyl, cycloalkyl, aralkyl, aryloxyalkyl, and aryl.

3. A synthetic diene rubber containing a stabilizing amount of a stabilizer which has the formula

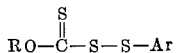

where R contains 1–8 carbon atoms inclusive and is selected from the group consisting of alkyl, cycloalkyl, aralkyl and aryloxyalkyl and Ar is selected from the group consisting of phenyl, tolyl, naphthyl and biphenylyl and substituted derivatives of these radicals wherein the substituents are selected from the group consisting of chlorine, bromine, hydroxy, alkoxy, nitro and amino.

4. A synthetic rubber according to claim 3 in which R is lower alkyl and Ar is nitrophenyl.

5. A synthetic rubber according to claim 3 in which R is lower alkyl and Ar is phenyl.

6. A synthetic rubber according to claim 3 in which the stabilizer is ethoxythiocarbonyl 2-nitrophenyl disulfide.

7. A synthetic rubber according to claim 3 that contains from 0.5 to 2.0 parts by weight of the stabilizer per 100 parts by weight of synthetic rubber.

8. A synthetic rubber according to claim 3 in which the stabilizer is ethoxythiocarbonyl phenyl disulfide.

References Cited by the Examiner

UNITED STATES PATENTS

| | | | |
|---|---|---|---|
| 2,244,021 | 6/1941 | Rosen et al. | 260—45.95 |
| 2,381,483 | 8/1945 | Blake et al. | 260—455 |
| 2,402,560 | 6/1946 | Langkammerer | 260—455 |
| 2,565,141 | 8/1951 | Marks | 260—45.7 |
| 2,956,043 | 10/1960 | Railsback et al. | 260—45.7 |

DONALD E. CZAJA, *Primary Examiner.*

LEON J. BERCOVITZ, *Examiner.*

M. J. WELSH, *Assistant Examiner.*